RADIO RECEIVER ALIGNING APPARATUS AND METHOD

Filed Oct. 31, 1944 2 Sheets-Sheet 1

INVENTOR
MILLARD E. AMES, JR.
BY Samuel Ostrolenk
ATTORNEY

Jan. 31, 1950 M. E. AMES, JR 2,495,997

RADIO RECEIVER ALIGNING APPARATUS AND METHOD

Filed Oct. 31, 1944 2 Sheets-Sheet 2

INVENTOR
MILLARD E. AMES, JR.
BY [signature]
ATTORNEY

Patented Jan. 31, 1950

2,495,997

UNITED STATES PATENT OFFICE 2,495,997

RADIO RECEIVER ALIGNING APPARATUS AND METHOD

Millard E. Ames, Jr., Philadelphia, Pa., assignor to Philco Corporation, Philadelphia, Pa., a corporation of Pennsylvania Application October 31, 1944, Serial No. 561,287

6 Claims. (Cl. 250—20)

This invention relates to the adjusting process which is carried out in the alignment of radio receivers. In particular, it relates to a specific type of apparatus to be used to facilitate the adjustment on the radio receiver, particularly and especially in the adjustment of the tuning of the radio frequency part of the system and the tuning of the intermediate frequency part of the system. It provides means for plotting frequency response curves upon the oscilloscope screen so that the operator can at once observe the effect of adjustment which he may make upon the radio receiver, and so that the operator may carry out a complete set of adjustments without making any changes whatsoever in the signal generator.

In the adjustment of radio receivers, it is the custom to effect adjustments in such a manner that the receivers have a specified frequency response in the neighborhood of the carrier frequency. This is done in order to assure proper quality in the output of the receiver. One convenient method of performing such tests is to supply the radio receiver with a frequency modulated wave. Such frequency modulations may be developed by any one of several means and usually extends about 10 kilocycles to 20 kilocycles each side of a fixed carrier position.

The varying voltage which causes the variation in the frequency of the signal generator is customarily applied to the horizontal plates in an oscilloscope tube, and the output of the receiver is applied to the vertical plates. The result is that the plot appearing on the oscilloscope screen is the frequency characteristic of the radio receiver over a narrow band of frequencies in the neighborhood of the frequency to which the signal generator is tuned.

With such a picture appearing on the oscilloscope screen, the operator can at once observe the effect of any changes that he may make in the adjustment of the receiver. Thus, he proceeds to make his adjustment and when he finds that he has obtained the proper curve on the oscilloscope screen he considers that the receiver is properly adjusted.

This, however, is true only for the frequency at which he has had his signal generator tuned. He must then reset his signal generator and retune his radio receiver and observe whether or not his adjustments are still satisfactory. If they are not satisfactory, he must of course change them until they are satisfactory and he must make these adjustments until they are satisfactory at several places in the radio frequency spectrum, usually in the broadcast spectrum.

However, the same procedure may be used for short wave broadcasts, for the FM bands, for the television bands, or for any radio frequency band.

Such systems have the disadvantage that they require that each time the operator desires to adjust his receiver at a new frequency, he must retune his signal generator to the same frequency. This is a time consuming process which is not well suited to be used with production line methods.

It is the purpose of this invention to provide a source of radio frequency power which will have a series of carrier frequencies, each one of which will be modulated by a sufficient broad frequency modulation to be used in the adjustment of radio receivers. Also there is available a signal of broad frequency modulation so that the operator can observe on his oscilloscope screen two patterns. One of these patterns will be the pattern of the adjustment near the carrier frequency, the other will be the pattern giving the response of the receiver over the entire broadcast spectrum. Thus is will enable him to determine which one of the particular sources of frequencies his radio receiver is receiving. The broad frequency modulated signal provides a check over the entire range and thus enables detection of dead spots. Thus, as he tunes the dial of his radio receiver, he will be able to receive frequency modulated signals at a series of points on the dial and will be able to adjust his radio receiver at these points.

The invention will be described in terms of five such points, but this choice is governed by the fact that this seems to be the optimum number of points at which the radio receiver should be adjusted. It of course could be lowered if it was felt desirable to do this, or it could be raised.

Accordingly, an object of my invention is to provide a novel method and circuit for testing radio receivers.

A further object is to provide a novel method of generating a plurality of carriers which are simultaneously made visible in a circuit testing device.

A further object is to provide simultaneously several FM signals having the same frequency modulation by virtue of the modulation being derived from one oscillator.

The arrangements for carrying out the purposes set forth in this invention are best described in connection with the figures as follows.

The frequency band which is normally covered in testing broadcast radio receivers runs from about 540 kilocycles to somewhat over 1700 kilocycles. Experience in testing shows that if five frequencies are used for adjusting the radio receiver, the receiver will behave satisfactorily at frequencies in between these frequencies.

The frequencies which I have chosen as carrier frequencies are 580 kilocycles, 1000 kilocycles, 1400 kilocycles, 1500 kilocycles and 1700 kilocycles. Their position on the radio frequency broadcast spectrum is shown in Figure 1.

Figure 1:
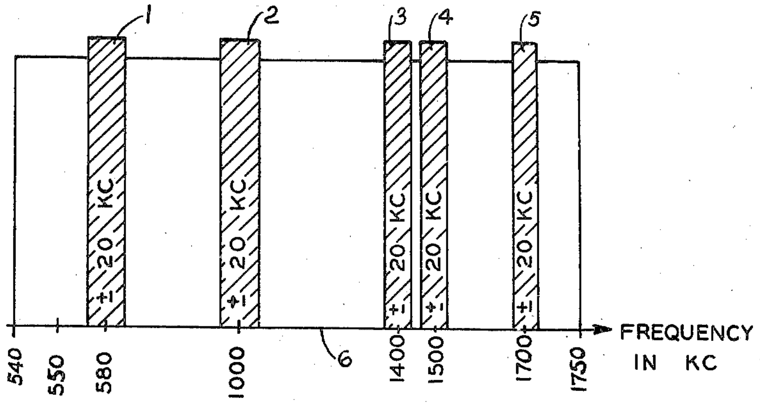
Figure 1 shows a diagram of the broadcast spectrum with certain specified bands shown.

The diagram of Figure 1 shows the radio frequency spectrum of the broadcast range. On this spectrum there are located the five frequencies at which I propose to adjust my radio receiver during mass production. Centered on each one of these frequencies there is shown a frequency band of plus and minus 20 kilocycles on each side of the carrier frequency. There is also shown the wide band from 540 kilocycles to 1750 kilocycles.

One form of my invention generates these frequency modulated signals alternately. That is, it generates first the wide band frequency modulation of from 540 to 1750 kilocycles for one sweep. Then it generates simultaneously all of the five narrow-band frequency-modulated signals, sweeping from 20 kilocycles below the carrier to 20 kilocycles above the carrier for each of the five bands shown in Figure 1.

Figure 2:
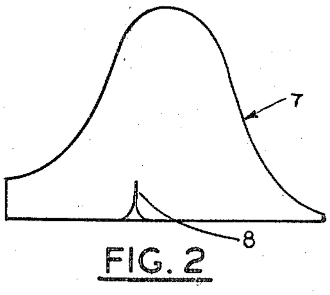
Figure 2 shows a diagram of the trace seen on the screen of the oscilloscope tube using this invention.

The single sweep voltage causing these frequency modulations is impressed upon the horizontal deflecting circuit of the cathode ray oscilloscope. The result of this type of deflection is shown in Figure 2.

During the time that the narrow band frequency-modulated signals are being generated, if the radio receiver is tuned to any one of the five carrier frequencies, that particular frequency will cause an output from the radio receiver, and a selectivity curve such as is shown in 7 will be generated upon the screen of the cathode ray oscilloscope.

This arises from the fact that the vertical deflection of the cathode ray oscilloscope is proportional to the output of the radio receiver because it is connected to it directly.

During the time that the wide band frequency-modulated signal is being generated, the horizontal sweep on the cathode ray oscilloscope represents a much wider range in frequency variation than it does during the time when the narrow sweep is on the cathode ray oscilloscope. Nevertheless, the response of the radio set itself appears as the vertical element on the cathode ray oscilloscope screen, although the output of the radio receiver thus will be lower than it was for the narrow band reception because the input from the wide band frequency-modulated generator is lower than the input from the narrow band frequency modulation generator.

Thus during the time that the wide band frequency modulation signal is being received, the picture on the cathode ray oscilloscope will show a small pip shown as 8 in the diagram. This pip is the response of the radio receiver to the wide band frequency modulation, and serves the purpose of showing the frequency at which the radio receiver is tuned. If the radio receiver is receiving no signal except the signal from the signal generator, high precision is not needed in this indication, since only one of five frequencies can possibly be received. This pip then will serve to indicate which of the five frequencies is being received, and suitable calibration markings may be drawn or otherwise placed on the oscilloscope screen to indicate the positions at which the pips should appear. These may be marked with the appropriate frequency designation.

The switching of the signals from broad band to narrow band and back to broad band is best accomplished by means of electronic switching. Many circuits are available in the electronic art for this purpose and this electronic switching circuit has been indicated in Figure 3 as the timing and blanking generator 15. This generator supplies a sweep signal to the frequency modulated phase shift oscillator for the broad band system going from 540 to 1750 kilocycles. It also controls the five radio frequency oscillators 10, 11, 12, 13 and 14, all of which receive their frequency modulation from one frequency modulated phase shift oscillator 24. In addition to these oscillators, there is an intermediate frequency oscillator providing frequency of 455 kilocycles plus or minus 20 kilocycles. This oscillator 9 receives this frequency modulation from the same phase shift oscillator that supplies the other units 24. The advantages of this type of arrangement will become apparent below. In this arrangement the added feature of having the intermediate frequency available with its full frequency modulation of plus or minus 20 kilocycles is a decided advantage since this can be used for adjusting and aligning the intermediate frequency stage of the receiver before any adjustments are made on the radio frequency stage of the receiver.

Any one of several timing sequences could be used in the electronic switching but I prefer to alternately switch on (1) the broad band frequency modulation oscillator and (2) the series of radio frequency oscillators and the intermediate frequency oscillator together, and to successively repeat this sequence in rotation. The combined output signals of all of these systems are fed at point 18 into the transmission line 17. From the transmission line they enter the attenuator 19 and then they enter the receiver 20 which is under test. The output of the receiver is used to control the vertical deflection of the cathode ray oscilloscope 21. In addition, a signal from the timing and blanking generator provides the horizontal deflection of the oscilloscope thus giving a horizontal frequency axis.

Figure 3:
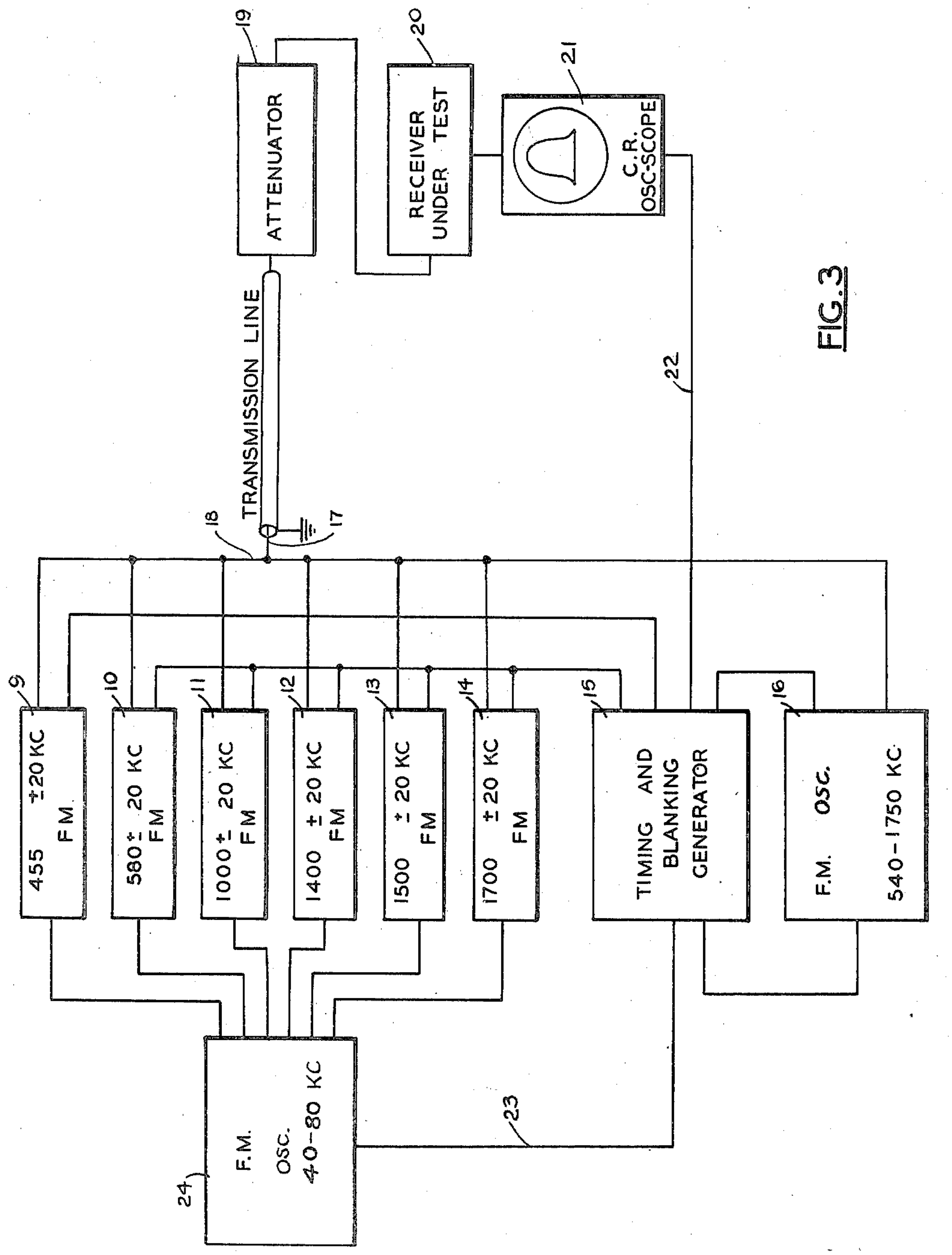
Figure 3 shows the block diagram of the complete system used to give the signals required for this invention.

Observation of this diagram of Figure 3 will show that all of the frequency modulation generators which use the plus or minus 20 kilocycle frequency modulation receive their modulation from one phase shift oscillator 24. This is a distinct advantage of this system since all of the radio frequencies and the intermediate frequency thus have the same calibration for frequency deviation from the carrier on the horizontal scale of the oscilloscope screen. This avoids unnecessary calibration trouble which would arise if each one of these frequency modulated oscillators were separately modulated.

Figure 4:
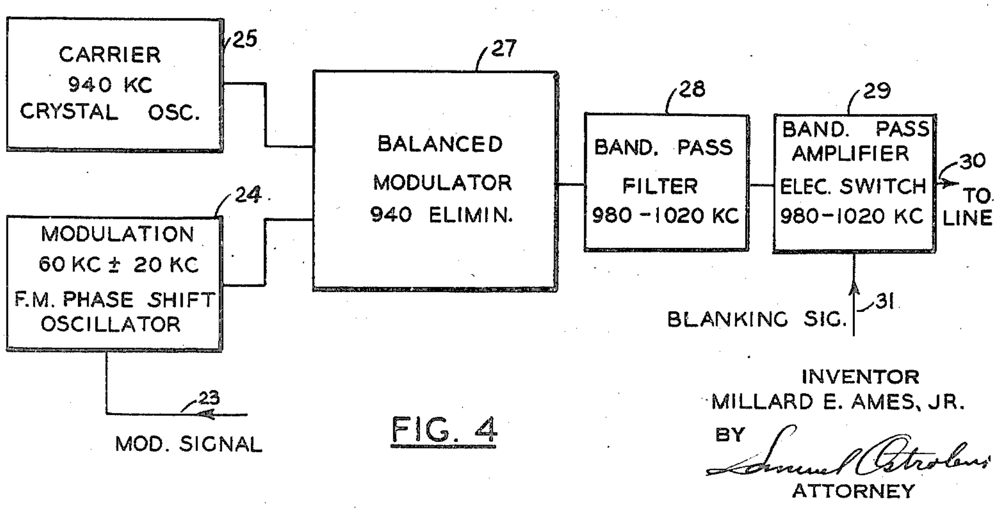
Figure 4 shows a block diagram of one of the narrow band frequency modulation signal generators used in the complete circuit of Figure 3.

The process of obtaining multiple frequencies all having the same frequency modulation impressed upon them is illustrated in the block diagram of Figure 4. The basic frequency modulated oscillator 24 generates a frequency of 60 kilocycles plus or minus 20 kilocycles. The frequency of this oscillator is controlled by a modulating signal which enters on line 23 from the timing and blanking generator.

In order to generate, for example, the 1000 kilocycle signal, I start with a crystal controlled carrier oscillator 25 generating a frequency of 940 kilocycles. This oscillator 25 feeds into a balanced modulator 27 as does the phase shift oscillator 24 which provides the frequency modulation. These two signals are combined in the balanced modulator, and the carrier frequency of 940 kilocycles is eliminated. The output of this balanced modulator will contain two fundamental frequencies, first 1000 kilocycles, the sum of 940 and 60 kilocycles, and second 820 kilocycles, the difference of 940 and 60 kilocycles. Of course, each of these will be frequency modulated plus or minus 20 kilocycles. The first will have a range of from 980 to 1020 kilocycles, whereas the second one will have a range of from 860 to 900 kilocycles. This lower band is eliminated by the use of the band pass filter 28 which passes only the 980 to 1020 kilocycle signals. This signal passes through a band pass amplifier 29 which is also used as an electronic switch. During the time when it is desired to operate some other part of the system, such as the wide band frequency modulation oscillator, a blanking signal received over line 31 cuts the gain of amplifier 29 down to zero. Thus during this time there will be no output to the line through circuit 30. However, when this blanking signal is removed, the gain in the amplifier becomes normal and during this period an output is presented to the transmission line.

This method of modulating all of the narrow band frequency modulated generators from the same basic FM oscillator has considerable advantage in that it enables the same scale to be used on the horizontal axis of the oscilloscope screen for all of the adjustments which are to be made. These narrow band frequency scales are of course the ones which are of utmost importance in the lining-up of the radio receiver.

From the above it will now be clear that my invention constitutes a special type of radio frequency oscillator system to be used in the tuning up and aligning of radio receivers. Over one transmission line it supplies alternately, first an R. F. signal, frequency-modulated over a wide frequency band, and then a series of R. F. signals, frequency-modulated in synchronism over a narrow band of frequencies, each band centering on a pre-selected carrier frequency, which may be crystal controlled if desired. These alternations of signals occur in rapid succession.

Over another line there is supplied a sweep signal whose value is related in a definite manner to the frequency in the first of the aforementioned alternating signal, and to the deviation from the carrier of each of the second aforementioned series of signals. Thus it is possible to show on an oscilloscope screen the response characteristic of a radio receiver tuned to any one of the carrier frequencies included in the aforementioned series of carrier frequencies, and it is furthermore possible to quickly identify the particular carrier frequency to which the receiver is tuned. All of these features are accomplished in such a manner that the testing operator need only attach the receiver under test to the system and then operate the controls of the receiver. No adjustment of the source of R. F. signals is required during the alignment of a receiver. Consequently several receivers may be simultaneously and independently adjusted, tested and aligned using the R. F. signals from a common source. Thus the installation of multiple testing stations becomes relatively inexpensive.

The same system may of course be used to generate and transmit the signals necessary to adjust FM and television receivers. From the above it will now be clear that it is possible through the use of proper blanking to combine both 455 kilocycle intermediate frequency and FM receiver intermediate frequency signals on the same line so that dual channel, simultaneous IF padding and adjustment may be used.

My invention has been described in connection with definite frequencies and definite frequency spreads, and also in connection with a specific arrangement of elements. These are to be considered as examples of the principles involved.

I claim:

1. In a system for testing a receiver having an input circuit and an output circuit, a plurality of oscillators for generating a plurality of individual carrier frequencies within a predetermined frequency range, a modulator connected to the output of each of said oscillators, a common source of modulating signal frequency connected to each of said modulators for frequency modulating the oscillations of its associated oscillator, means including circuit connections from the output of each of said modulators for applying said frequency modulated carrier frequencies to the input of said receiver, a cathode ray tube oscilloscope connected in the output circuit of the receiver being tested for indicating the response characteristic of said receiver, said response being indicated by a deflection of the cathode beam in one direction, and means for sweeping the beam in the other direction in synchronism with the modulation of said carrier frequencies.

2. In a system for testing a receiver having an input circuit and an output circuit, a plurality of oscillators for simultaneously generating a plurality of individual carrier frequencies within a predetermined frequency range, a modulator connected to the output of each of said oscillators, a common source of modulating signal frequency connected to each of said modulators for frequency modulating the oscillations of its associated oscillator, means including circuit connections from the output of each of said modulators for applying said frequency modulated signals to the input circuit of the receiver to be tested, a cathode ray tube oscilloscope connected in the output circuit of said receiver being tested for indicating the response characteristic of said receiver, said response being indicated by a deflection of the cathode beam in one direction, and means for sweeping the beam in the other direction in synchronism with the modulation of said carrier frequencies.

3. In a system for testing the response characteristic of a radio receiver having an input circuit and an output circuit, means for generating a plurality of carrier frequencies within a predetermined range, means for modulating each of said carrier frequencies over a narrow band, means for generating a broad band modulation over said entire predetermined range, a cathode ray tube oscilloscope connected in the output circuit of said receiver to be tested, means for applying the narrow band modulated signals from said plurality of generators to said input circuit of said receiver simultaneously and for applying said broad range modulation alternately with the simultaneous application of said narrow band modulated signal, means for alternately sweeping said oscilloscope in synchronism with said broad band modulation and in synchronism with said narrow band modulation, said oscilloscope being swept in synchronism with said broad band modulation during the period that said broad band modulator is operatively connected to said receiver under test, and said oscilloscope being swept in synchronism with said narrow band modulation during the period when said narrow band modulated signals are being applied to said receiver.

4. In a system for testing the response characteristic of a radio receiver having an input circuit and an output circuit, means for generating a plurality of carrier frequencies within a predetermined range, means for frequency modulating each of said carrier frequencies over a narrow band, means for generating a broad band modulation over said entire predetermined range, a cathode ray tube oscilloscope connected in the output circuit of said receiver to be tested, means for applying the narrow band signals from said plurality of generators to said receiver simultaneously and for applying said broad band alternately with the simultaneous application of said narrow band of modulated signals, means for alternately sweeping said oscilloscope in synchronism with said broad band modulation and in synchronism with said narrow band modulation, said oscilloscope being swept in synchronism with said broad band during the period that said broad band is operatively connected to said receiver under test, and said oscilloscope being swept in synchronism with said narrow band during the period when said narrow band modulated signals are being applied to said receiver.

5. The method of visually testing with a cathode ray tube and aligning a radio receiver having an input circuit and an output circuit, which comprises applying a series of narrow bands of frequencies over a predetermined range to the input circuit of the receiver under test alternately with a broad band of frequencies over the entire predetermined range, applying the signals from the output of the receiver to produce visual indications on the cathode ray tube oscilloscope, producing deflections therein in one direction in accordance with the signals in the output of the receiver and sweeping the beam of the oscilloscope in its other direction in synchronism with the variations of frequencies in the narrow bands of frequencies and in synchronism with the variation in frequency of the broad band of frequencies and alternately with each other.

6. The method of visually testing with a cathode ray tube and aligning a radio receiver having an input circuit and an output circuit, which comprises applying a series of frequency modulated signals over a predetermined range of frequencies to the input circuit of the receiver, deflecting the beam of the cathode ray tube in a vertical direction in accordance with the signals in the output of the receiver, sweeping the beam of the cathode ray tube in a horizontal direction in synchronism with the variations of frequency in the bands of frequencies, applying a band of frequencies covering the entire predetermined range of frequencies to the receiver in sequence with the aforementioned bands of frequencies and producing a horizontal sweep of the cathode ray beam in synchronism with the variations in frequency over the entire predetermined frequency range during the time that such variations are being applied to the receiver.

MILLARD E. AMES, Jr.

REFERENCES CITED

The following references are of record in the file of this patent:

UNITED STATES PATENTS

| Number | Name | Date |
|---|---|---|
| 2,084,760 | Beverage | June 22, 1937 |
| 2,145,483 | Jacob | Jan. 31, 1939 |
| 2,151,313 | Bagno et al. | Mar. 21, 1939 |
| 2,162,827 | Schrader | June 20, 1939 |
| 2,252,058 | Bond | Aug. 12, 1941 |
| 2,298,409 | Peterson | Oct. 13, 1942 |
| 2,407,684 | Roberts | Sept. 17, 1946 |